(12) United States Patent
Melikyan

(10) Patent No.: US 8,075,652 B2
(45) Date of Patent: Dec. 13, 2011

(54) APPARATUS AND METHOD FOR A SPLIT TYPE WATER EXTRACTOR AND WATER DISPENSER

(75) Inventor: Zohrab Melikyan, Yerevan (AM)

(73) Assignee: Ser-Manukyan Family Holdings, Glendale, CA (US)

( * ) Notice: Subject to any disclaimer, the term of this patent is extended or adjusted under 35 U.S.C. 154(b) by 379 days.

(21) Appl. No.: 12/433,811

(22) Filed: Apr. 30, 2009

(65) Prior Publication Data

US 2010/0275779 A1 Nov. 4, 2010

(51) Int. Cl.
*B01D 50/00* (2006.01)
(52) U.S. Cl. .................................. 55/385.1; 62/150
(58) Field of Classification Search .......... 62/150, 62/283, 285; 95/288
See application file for complete search history.

(56) References Cited

U.S. PATENT DOCUMENTS

| | | |
|---|---|---|
| 5,106,512 A | 4/1992 | Reidy |
| 5,149,446 A | 9/1992 | Reidy |
| 5,259,203 A | 11/1993 | Engel et al. |
| 5,301,516 A | 4/1994 | Poindexter |
| 5,553,459 A | 9/1996 | Harrison |
| 5,669,221 A | 9/1997 | LeBleu et al. |
| 5,701,749 A | 12/1997 | Zakryk |
| 6,182,453 B1 | 2/2001 | Forsberg |
| 6,755,037 B2 * | 6/2004 | Engel et al. ............ 62/177 |

* cited by examiner

*Primary Examiner* — Robert A Hopkins
(74) *Attorney, Agent, or Firm* — Trojan Law Offices

(57) ABSTRACT

A split type potable water extractor from ambient air and water dispenser is invented, comprising separate water generating block located outside a water use area and water dispensing block located inside a water use area. The water generator block cycles refrigerant through a condenser and an evaporator to create condensation by heat exchange with ambient air circulated by an intake airflow system. The condensate water is collected and purified in a cascade of bactericidal loop to remove impurities. The purified water is pumped to a dispensing apparatus which can be installed in the home or other area of water use separate from the water generating block. If any one of the functional parts or units of water generator is disabled the water generator immediately stops operating to deliver water to the tank of the dispensing apparatus.

19 Claims, 13 Drawing Sheets

APPARATUS AND METHOD FOR A SPLIT TYPE WATER EXTRACTOR AND WATER DISPENSER

FIELD OF INVENTION

This invention relates to a technology for extracting water from ambient air for human use.

BACKGROUND OF THE INVENTION

In many developing and even developed countries there is a dire need for potable water. Moreover, in many areas water is taken from non-treated sources which may contain significant amounts of viruses, bacteria, heavy metals and other dangerous contaminants to human health. The Natural Resources Defense Council estimates that even in the U.S. hundreds of people die each year from water-borne diseases. Given the need for potable water, it is becoming urgent to develop highly efficient, simple and reliable technologies for generating pure water from ambient air.

In the prior art, water generators have not proven to be efficient in satisfying the need for potable water. Such water generators have suffered from a number of disadvantages, which make the energy and economic costs of producing potable water impracticable. One disadvantage is that such water generators are generally not designed to be of the split type, with the water generating unit separated from the water dispensing unit to optimize efficiency. Another disadvantage of prior art water generators is that they are equipped with evaporators having defrosting facilities based on hot refrigerant gas flow bypassing reverse cycle. The described kind of deicer system requires complication of the generator structure, and at the same time consumes more energy without producing water during all the process of reverse cycle defrosting. And yet another disadvantage of other water generators is that they are not energy efficient because they use compressors that operate to maintain a cold set-point temperature within the water reservoir which requires the operation of the compressors even when the generators do not actively produce water. Consequently, existing water generators have been demonstrated to consume a lot of energy while not allowing permanent and reliable water production.

Accordingly, there is a need for an efficient system and method of extracting potable water from ambient air according to this invention, wherein outside air is cooled by a refrigeration system in consequence of which the vapor contained in air is condensed and transformed into water which is collected in a closed tank and further, after having been purified in a cascade of bactericidal loop, is pumped into a water dispensing block, which can be installed in the home or other areas of water use. In present invention the disadvantages of the prior art are eliminated, while improving the reliability and energy efficiency, reducing initial cost per unit of water productivity, optimizing process parameters including air flow through the evaporator and condenser, and maintaining the quality of recovered water, etc.

The objects and advantages of the present invention are:

(a) providing a potable water source for use in remote and waterless areas;

(b) providing a potable water supplying split type installation consisting of a water generator block located outside and a water dispensing block located inside of the water use areas for delivering hot, cold and ambient temperature water;

(c) providing a stationary water generator that does not need to be moved or shifted and can be hanged on the wall outside surface or stand on ground near the house without occupying inside space and influencing the inside microclimate;

(d) providing a simple construction of water generator designed for operating long periods in non-freezing regime, without use of heating strip and hot gas reversing deicing systems;

(e) providing an apparatus which can easily be assembled from prefabricated elements and modules;

(f) providing a pure water generating apparatus that is proofed from organic compounds, insects and any other contaminations, in accordance with ASHRAE and U.S. federal standards;

(g) providing a low initial cost, high energy efficiency, reliable, cost effective and ecologically safe water generating apparatus;

(h) providing an apparatus which produces high-quality, purified water, by means of coating evaporator dew forming surface with special inert painting, with medical-grade tubing and with 314L stainless steel made interior and exterior cabinet;

(i) providing a stationary, high energy efficiency water generator which is equipped with variable speed fans for regulating the flow of intake outside air and respectively controlling the water productivity;

(j) providing a water generator which is equipped with direct and reverse rotating fans for intaking outside air and for periodically operating in reverse mode to move the air in reverse direction for expelling dust and pollen from the air filters to alleviate clogging of the air filters;

(k) providing a water generator which is equipped with inward-opening revolving doors installed on the vertical side panels of the water generating block and located between an evaporator and a condenser for regulating the quantity and temperature of air mixture blown through the condenser to regulate refrigerant condensation temperatures under various outside air temperatures and relative humidity;

(l) providing a water generator equipped with a processor charged by special program which regulates the refrigerant's condensation temperatures by mean of changing the openings of revolving doors and thereby changing quantity and temperature of air mixture blown through the condenser;

(m) providing a water generator which is equipped with a sampling servomechanism for automatic opening and proper positioning of revolving doors in response to the programmed matrix of required air flow through the evaporator and condenser under various combinations of air temperatures and relative humidity;

(n) providing a water generator which is equipped with gravity louvered screen doors, which automatically closes when the generator is switched off and prevents penetration of insects and bacteria into the mixing chamber;

(o) providing a water generator which is equipped with special sensors system and operating mechanism for stopping the operation of the generator when ambient air temperature is lower than 20° C. and relative humidity is less than 30%;

(p) producing potable water from outside air with much lower specific cost compared to bottled water.

SUMMARY OF THE INVENTION

This invention is for a split type potable water extractor from ambient air and water dispenser for use in remote and waterless areas consisting of a water generating block and a water dispensing block. The generating block is located outside the water use area and has direct contact with outside air and the water dispensing block is located inside the water using area. The extractor is designed to be split type, that is to say composed of separately standing water generating and water dispensing units (blocks).

The potable water generator block functions to extract water from the outside atmosphere air by cooling. The invented water generator block is a stationary device that does not need to be moved or shifted and can be hanged on the outside surface of wall or stand on ground near the house without occupying inside space.

The split type structure is directed to avoid of the problem of creating dry microclimatic conditions in the dwelling place that results from long period use of inside air as a water source since the inside air becomes extremely dried and, therefore, unusable as a sustained water source. For these reasons the developed apparatus uses only fresh outside air as water containing medium, which at the same time has the advantage of being much cleaner than the inside air.

The apparatus is designed for operating long periods without freezing problems because the intake air is not cooled up to the dew point temperature. Instead, in this extractor the surface temperature of the evaporator is kept below the dew point temperature of air by cold refrigerant.

In consequence of heat exchange the air is cooled up to temperatures far higher than the dew point, but enough for condensing the water vapor on the surface of evaporator. The water from the surface of the evaporator drips into a receptor pan and then runs into a closed tank system equipped with a level control device which is connected to the generator's switching off/on panel.

For producing high-quality, purified water the heat transfer surface of the evaporator is coated by special food type inert painting and all interior and exterior of the housing are maid of medical-grade 314L stainless steel. The generated water by the help of a pump repeatedly circulates through a cascade of water filters. This allows using high rate and small-pore, filter/adsorption media such as a porous-carbon block in the NSF 53 certified filter for filtration the water from organic compounds, insects and any other contaminations and for purifying it in accordance with ASHRAE and U.S. federal standards.

The purified water from the cascade of bactericidal loop through a solenoid valve, which is controlled by a timer, is pumped into a water storing tank of a dispensing block which is installed separately at home or other areas of water use. From this storing tank the collected pure water first passes through UV tube for sanitation purposes and then is distributed among tanks of ambient temperature water, hot water and cold water. The water is dispensed by push button type taps.

The water generator's refrigerant condenser is equipped with variable speed fans for regulating the quantity of intake outside airflow and respectively controlling the water productivity. The regulation of intake airflow takes place by changing the RPM of the fans. This is executed by commands of a processor operating in accordance to a matrix of airflow predetermined for outside air temperatures and relative humidity (RH) combinations. The fans can periodically perform in reverse mode for moving the air in reverse direction to expel dust and pollen from the air filters without shutting down the device. As a result, there is no need to complicate the filter assembly by sensors and other facilities to warn when the air filter is corked. In the reverse regime the outside air first passes through the condenser where it is heated and then passes through the evaporator and air filter in reverse direction. Besides cleaning the filter, the reverse flowing hot air stimulates the evaporation of the liquid refrigerant in the evaporator and eliminates the freezing of evaporator. During the short period of air filter cleaning the water generator continues operating and water production is not interrupted which saves rather energy and increase the water production. The periodicity of fan's air filter cleaning reverse operation is predetermined and executed by the help of a timer connected to the electric circuit of the fan's motor.

To control refrigerant condensation, it is necessary to control the quantity and temperature of the mixture of cooled and dried air and outside air blown through the condenser. For this purpose the water generator is provided with inward-opening revolving doors which are installed on both sides of the generator's air mixing chamber. The inward-opening revolving doors are located between the evaporator and the condenser for regulating the temperature and quantity of air flow through the condenser. The variation of airflow to the condenser is accomplished by automatic opening and proper positioning of the revolving doors by the control of a sampling servomechanism connected with the shaft of the doors. The sampling servomechanism operates in response to the commands of a processor acting in accordance to a programmed matrix of required air flow through the evaporator under various combinations of air temperatures and relative humidity. All openings, doors and ports are equipped with gravity louvered screen doors, which automatically close the port to prevent penetration of insects and bacteria into the air mixing chamber when the generator is switched off.

The water generator is equipped with a special sensors system and operating mechanism for stopping the operation of the generator when ambient air temperature is lower than 20° C. and relative humidity is less than 35%. If ambient air temperature goes higher than 20° C. the sensors system and operating mechanism automatically restart the generator and the water supply is continued. If any one of the units of water generator is disabled the apparatus immediately stops functioning to deliver water to the tank of the dispensing block. If both the generator block's water tank and the dispensing blocks' water storing tank are full of water, the level control device switches off all parts of the generator.

The invented water generator does not need any type of energy consuming deicing system and, therefore, it is energy efficient and simplified by construction. It can easily be assembled from prefabricated equipment, elements and modules.

The saving features of present water generating apparatus provide lower initial cost, higher energy efficiency, cost effectiveness and is ecological safe. Thanks to the indicated series of advantages the specific cost of produced in this machine water is much cheaper compared to bottled water.

DESCRIPTION OF THE PREFERRED EMBODIMENTS

Figure 1:
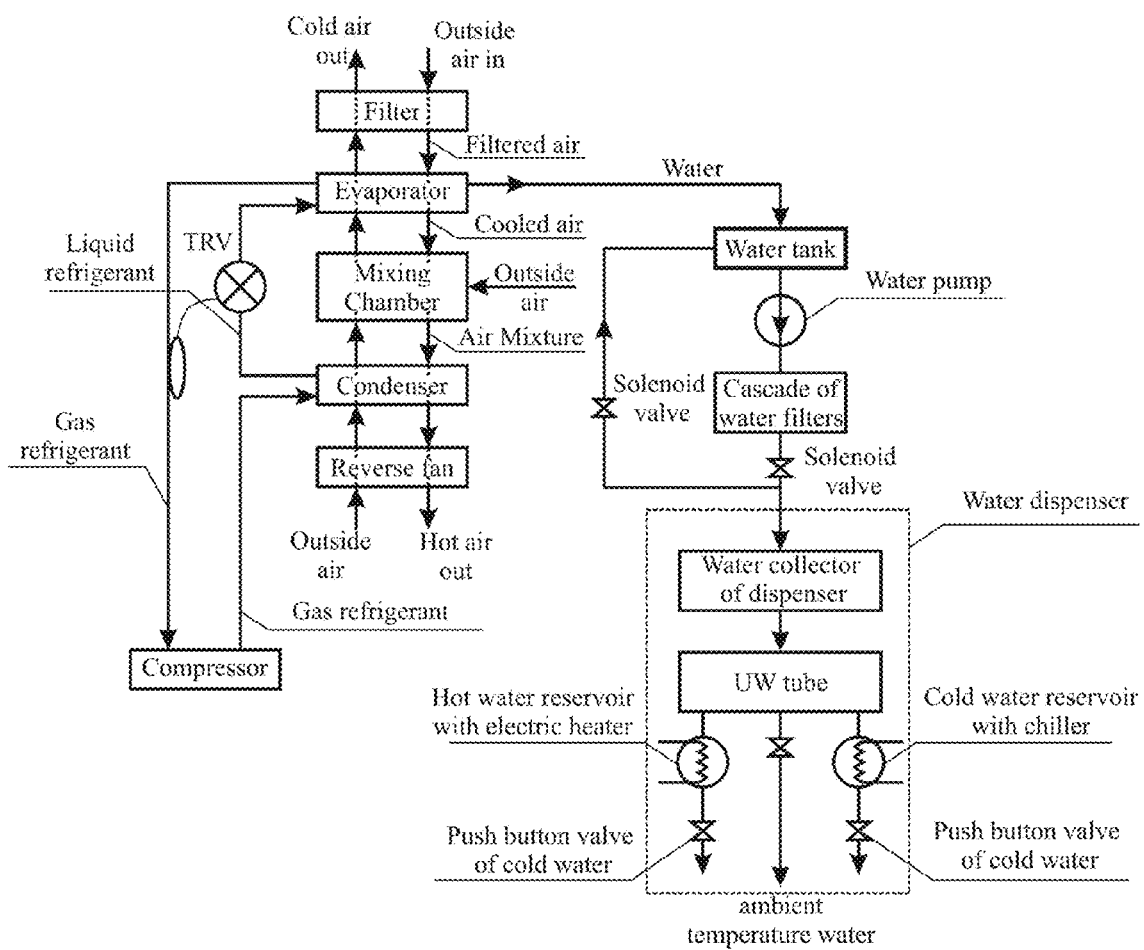
FIG. 1. is a block diagram showing the individual functional components, sub-assemblies, and interconnections which comprise the present invention and alternative embodiments thereof.

The water generation process, treatment and dispensing flow diagram are shown in FIG. 1, which represents functional components, sub-assemblies, controls, interlocks and provides the sequences of air treatment, water formation and purification, water dispensing and operation of all main and auxiliary equipment.

Figure 2:
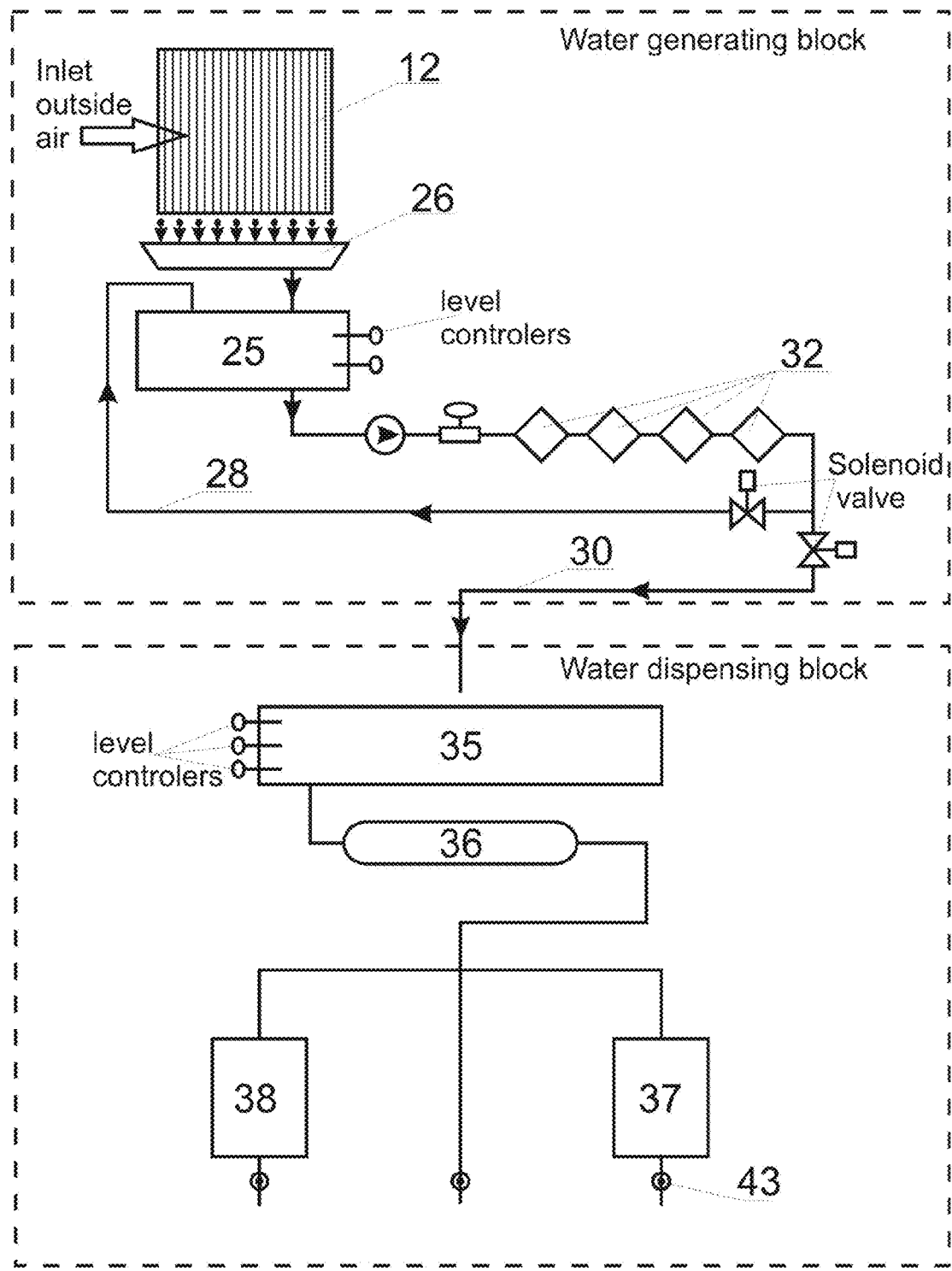
FIG. 2. is a block diagram showing the hydraulic scheme and functional components, sub-assemblies, controls, interlocks, which comprise the present invention and water dispensing embodiments.

FIG. 2. is a block diagram of the functional components, sub-assemblies, controls, interlocks of water dispensing block with cooled, heated and ambient temperature waters according to an embodiment of the present invention.

Figure 3:
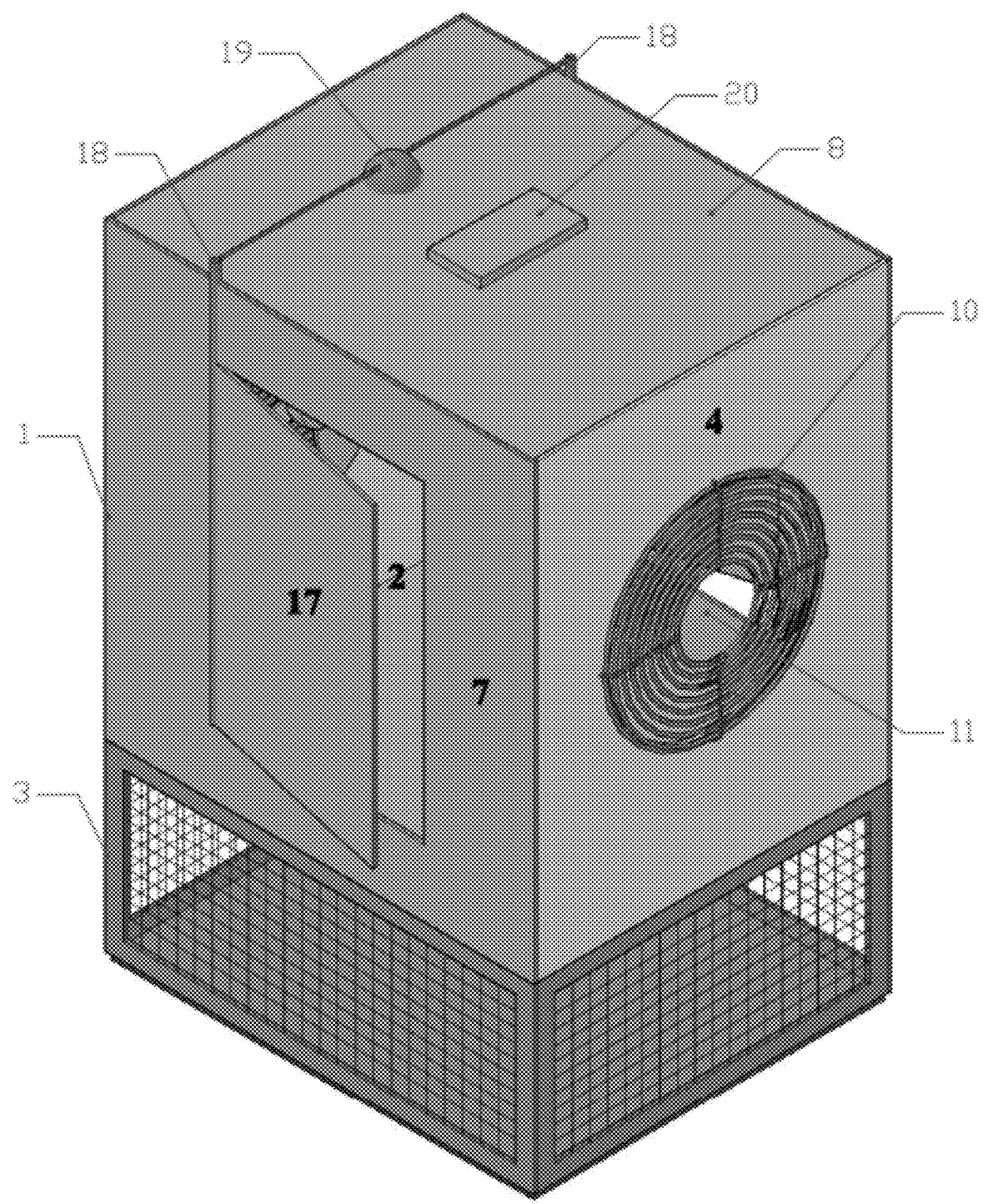
FIG. 3. is a front perspective view of a water generating block according to an embodiment of the present invention with air mixing and compressor chambers.
Figure 4:
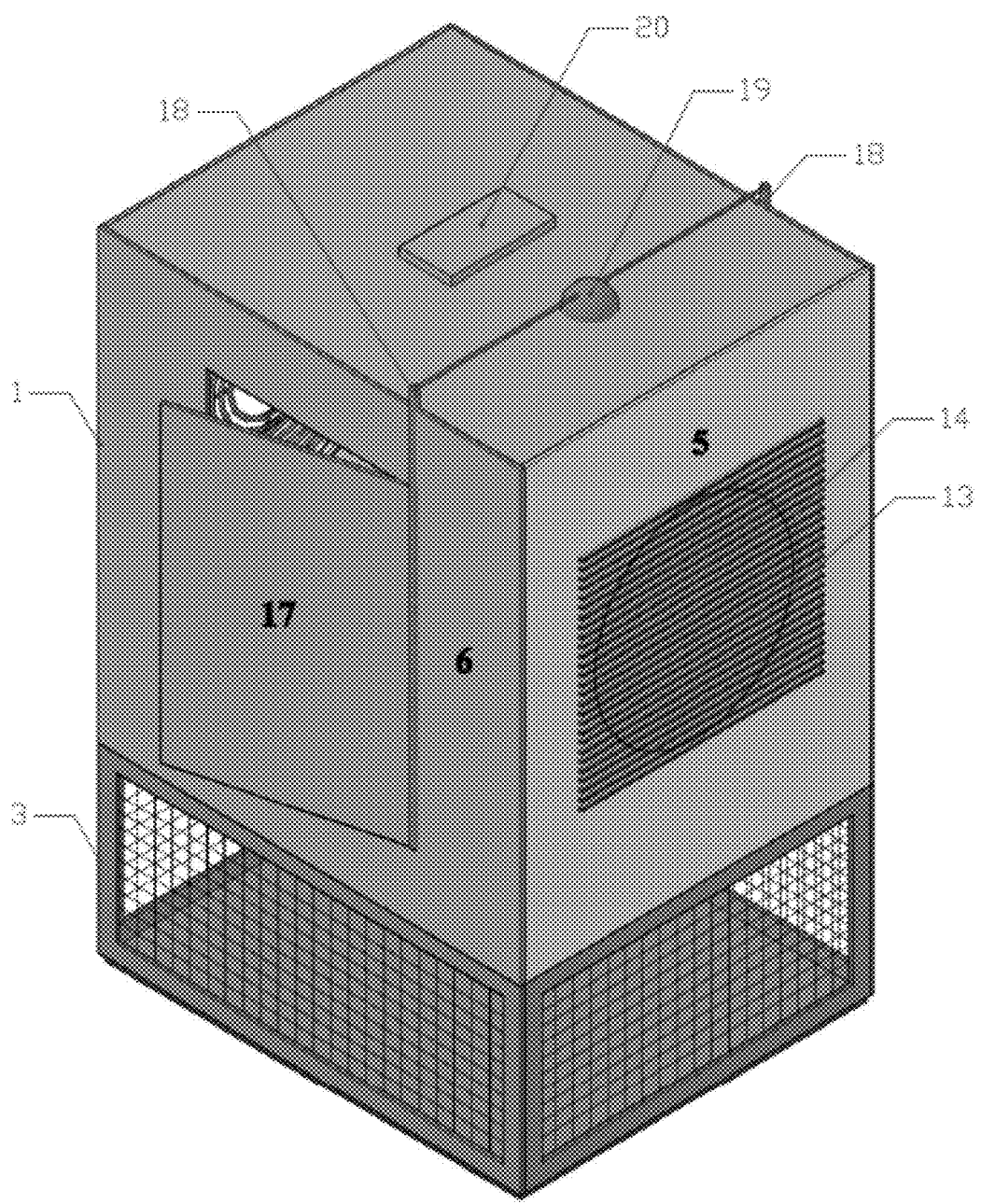
FIG. 4. is a rear perspective view of a water generating block according to an embodiment of the present invention with air mixing and compressor chambers.

FIG. 3 and FIG. 4 represent perspective views of the new configuration of the invented water generation system. The working components are enclosed in an air mixing chamber (2) formed by front panel (4) with intake air inlet port (10) and intake air filter (11), rear panel (5), vertical right side panel (6) with an inward-opening revolving door (17) with shaft (18), vertical left side panel (7) with an inward-opening revolving door (17) with shaft (18), top panel (8) with sampling servomechanism (19) and position command generating processor (20), as well as the compressor chamber (3) and ventilation grills (22).

In the perspective view of an embodiment of the water generating block of FIG. 4 is shown the rear panel (5) of the air mixing chamber (2) on which is located a port (13) for outlet of processed and dried air. The port (13) is equipped with a gravity type louvered screen (14) which automatically closes for preventing the penetration of insects and dust in the air mixing chamber (2) when water generating block is switched off. On the vertical right side panel (6) of the mixing chamber (2) is installed an inward-opening revolving door (17) for inflow of outside air and mixing with dried cooled air allowing air mixture of higher quantity and lower temperature which passes through the condenser (15) mounted on the rear panel (5) of the mixing chamber (2) (see FIG. 5). The noted air mixture of higher quantity and lower temperature provides better cooling and efficient condensation of the refrigerant in the condenser which is especially needed when the generator operates under very hot and humid climatic conditions.

Figure 5:
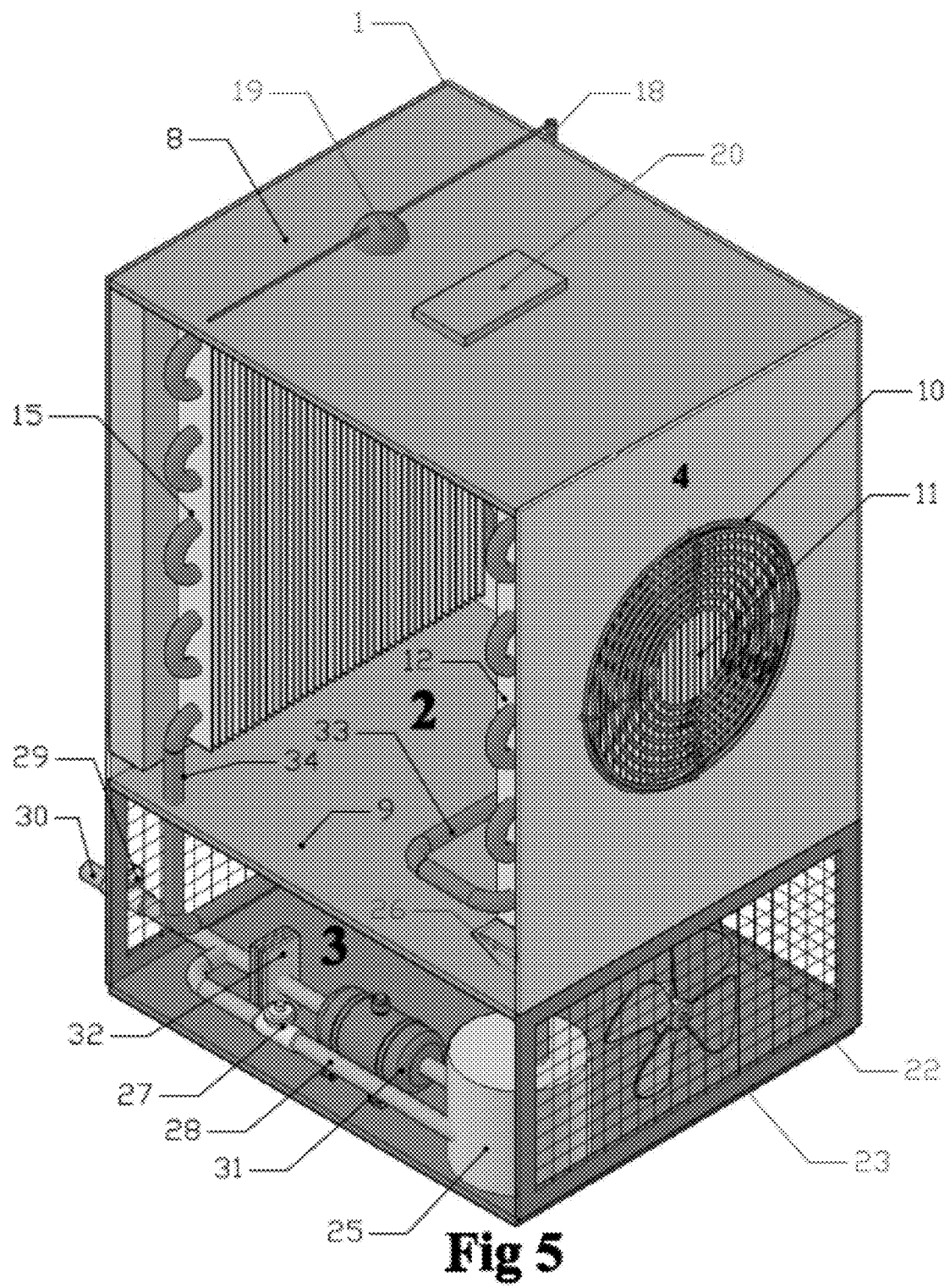
FIG. 5. is a perspective view of a water generating block according to an embodiment of the present invention, with a cut-away inside perspective view of the air mixing chamber and the compressor chamber.

FIG. 5. is a cut-away inside perspective view of the water generating block with the left side vertical panel (7) of air mixing chamber (2) removed to show the evaporator (12) mounted on intake air inlet port (10). The intake air inlet port (10) has an easily replaceable air filter (11). A water receiving tray (26) is installed under evaporator (12) for collecting by gravity the water drops extracted from cooled air on the food graded coated surface of evaporator (12). On the outlet air port (13) of the rear panel (5) the condenser (15) is mounted. In FIG. 5 the inside perspective view of compressor chamber (3) is also represented. The compressor chamber (3) is completely separated from the mixing chamber (2) by bottom panel (9) for preventing hot air penetration from compressor chamber (3) into the air mixing chamber (2) which can result in changes of predetermined temperature regimes of the condenser and evaporator.

Figure 6:
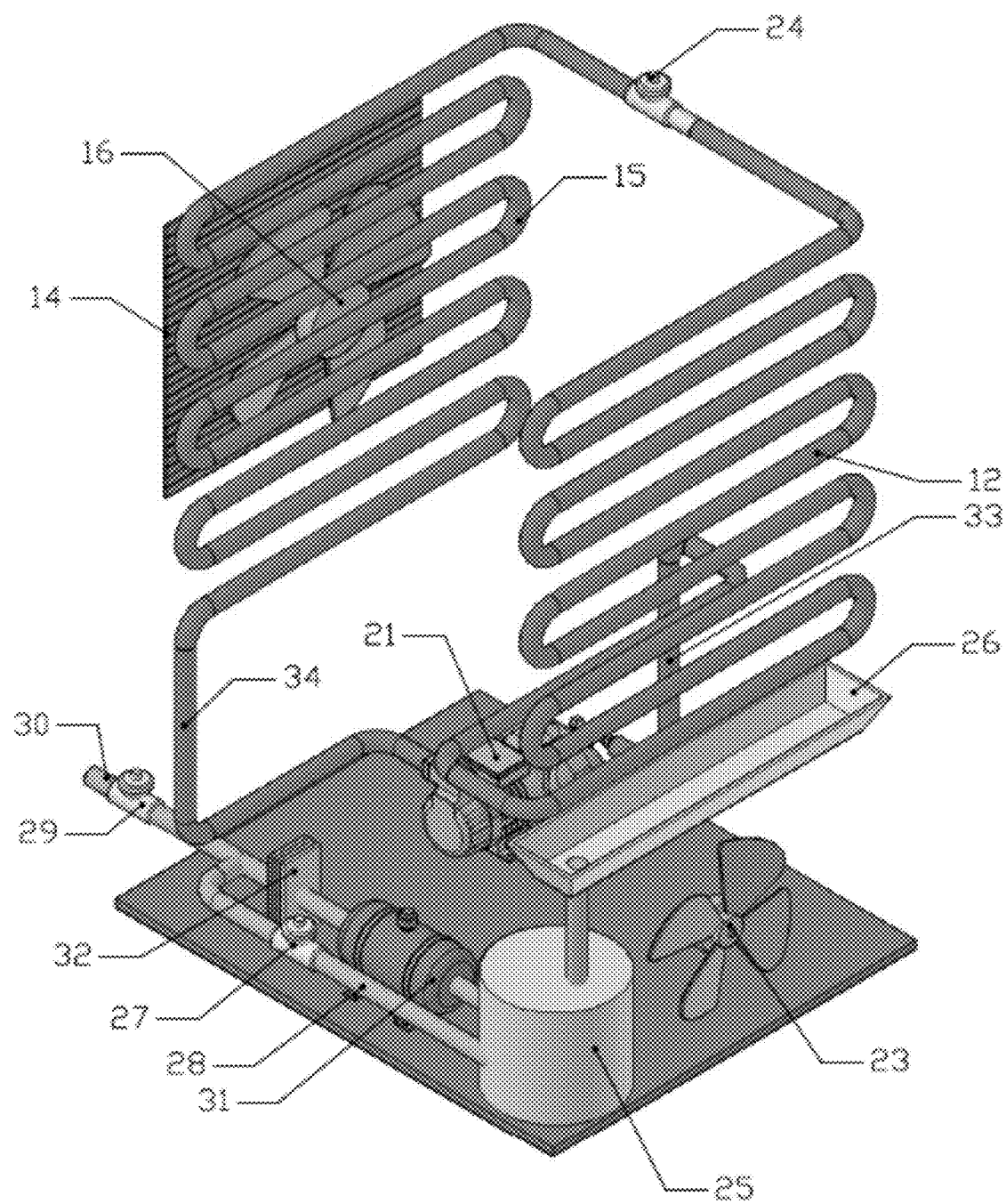
FIG. 6. is a perspective view of the core of the water generating block with interconnections of all functional parts including: evaporator fin tube coil with water receiving tray, condenser fin tube coil with variable speed reverse fan and gravity type louvered screen, refrigerant temperature regulating valve (TRV) mounted on liquid line, and compressor chamber with compressor, ventilation fan, water collecting tank, water solenoid valves, water pump, cascade of water filters, water supply pipe to the dispenser block.
Figure 7:
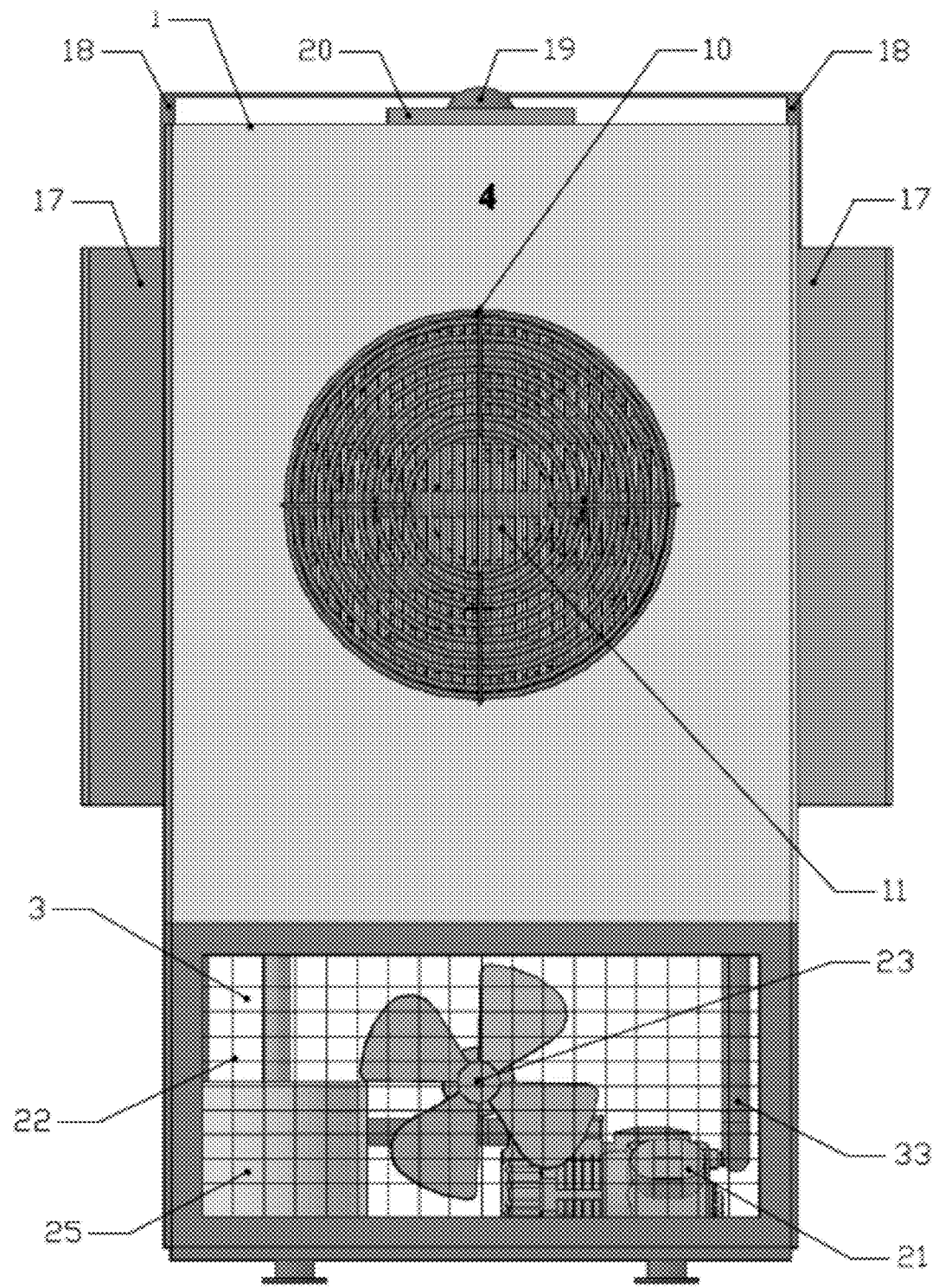
FIG. 7. is a front view of an embodiment of the water generating block.
Figure 8:
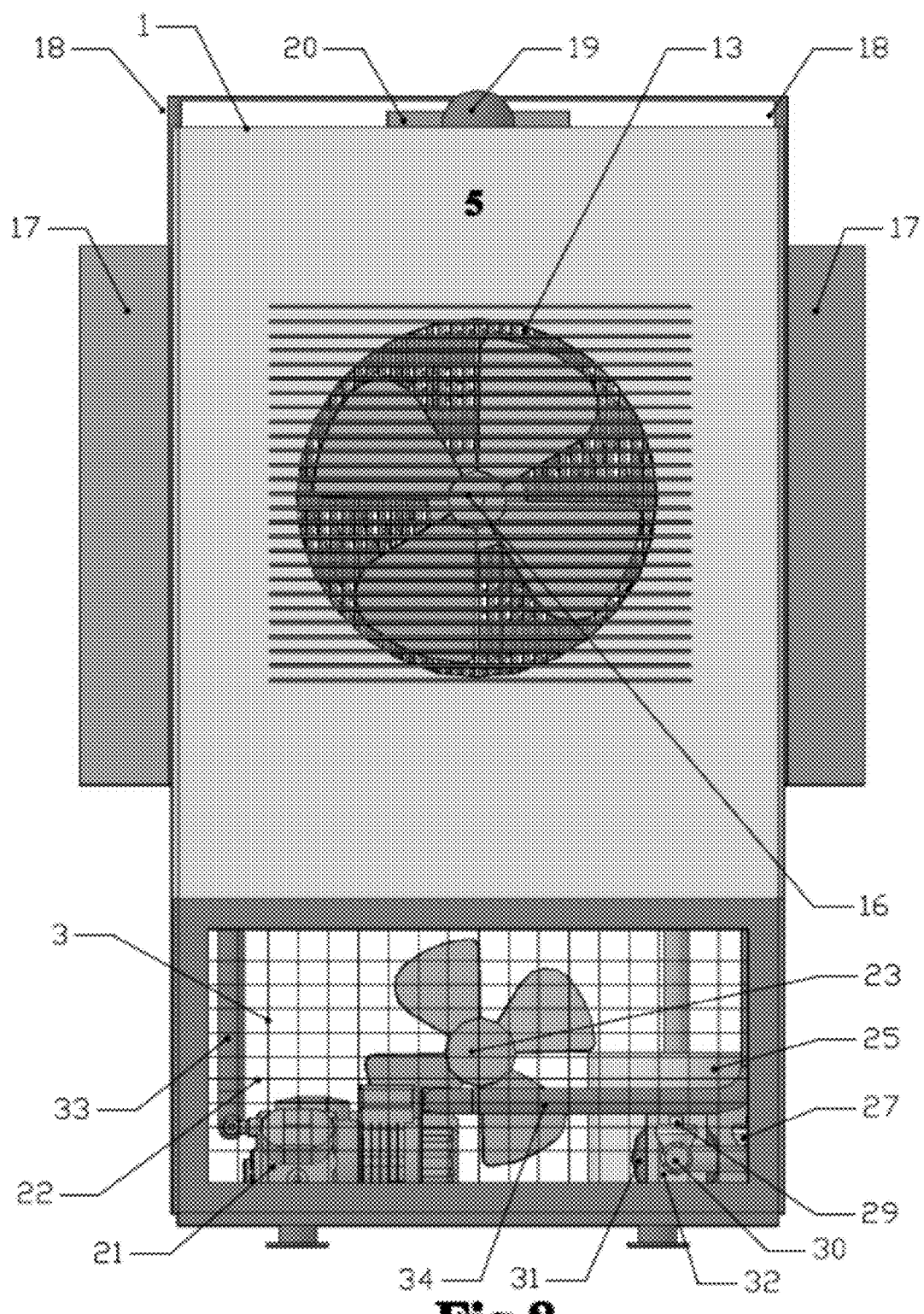
FIG. 8. is a rear view of an embodiment of the water generating block.
Figure 9:
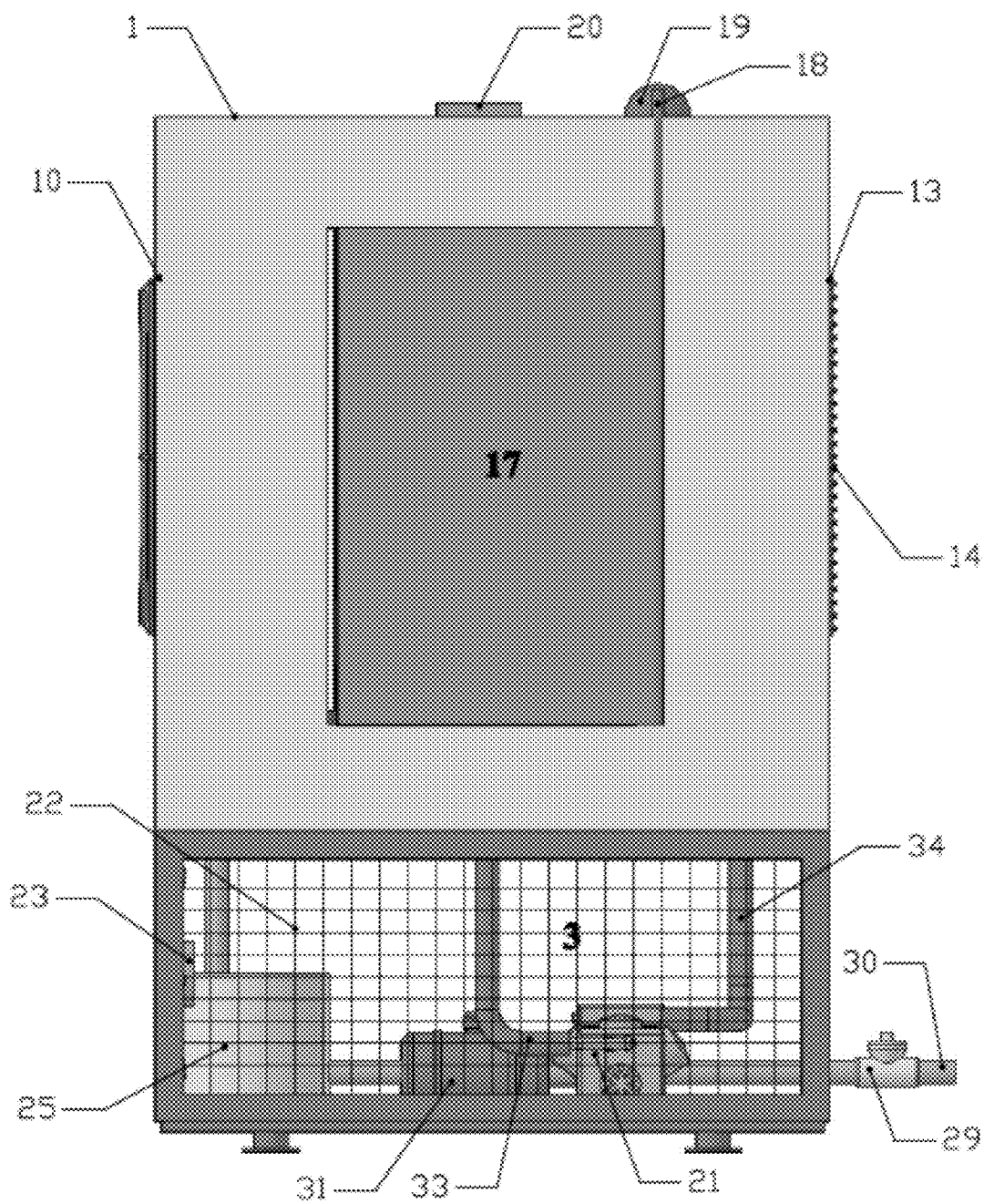
FIG. 9. is a right side view of an embodiment of the water generating block.
Figure 10:
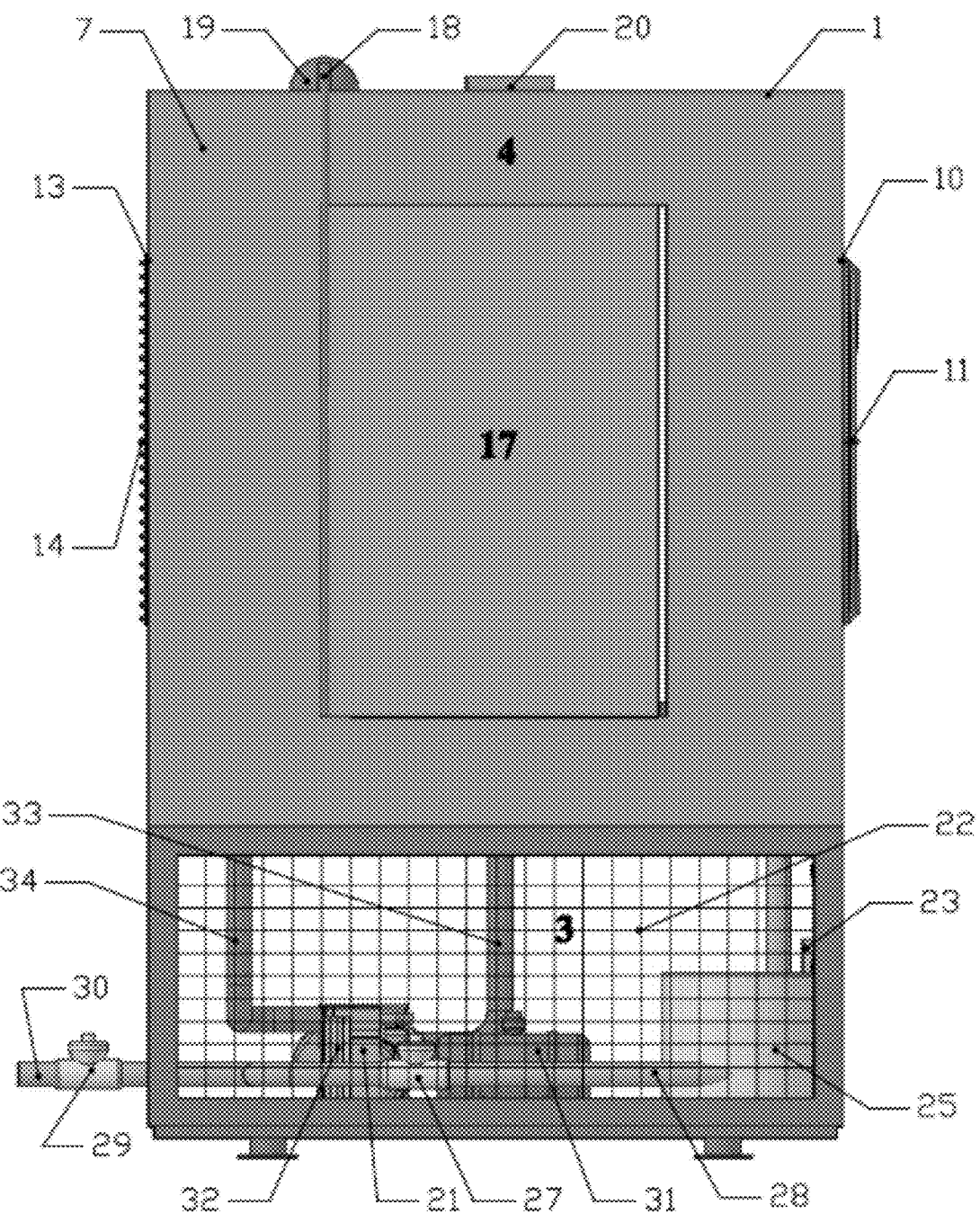
FIG. 10. is a left side view of an embodiment of the water generating block.

FIG. 6. represents a perspective view of the core of water generating block with interconnections of all functional parts including: evaporator fin tube coil (12), water receiving tray (26), condenser fin tube coil (15) with variable speed reverse fan (16) and gravity type louvered screen (14), refrigerant temperature regulating valve (TRV) (24) mounted on liquid refrigerant line. The implementation of the variable speed reverse fan (16) allows cleaning of the intake air filter by means of reverse air stream periodically blown through the air filter in reverse direction without stopping the generator. This method of filter air cleaning increases the water generation efficiency. FIG. 6 represents also the perspective view of interconnections of the compressor (21) with its suction (33) and discharge (34) tubes, ventilation fan (23), water collecting tank (25), water solenoid valves (27) and (29), water pump (31), cascade of water filters (32), water supply pipe (30) to the dispenser block.

FIG. 7, FIG. 8, FIG. 9 and FIG. 10 are respectively front view, rear view, right side vertical view and left side vertical view of the basic embodiment of the present invention. The figures include front (4), rear (5), right side (6) and left side (7) vertical panels of the air mixing chamber (2) with both of the inward-opening revolving doors (17), shafts (18) connected to the sampling servomechanism (19) and revolving doors required positions command generating processor (20) on the top panel (8). In the mentioned figures are shown all four side vertical views of the compressor chamber (3) including: compressor (21) with refrigerant suction (33) and discharge (34) piping, water collecting tube connected to the water collecting tank (25), water pump (31), cascade of water filters (32), water supplying pipe (30) with water solenoid valve (29), water recirculation pipe with solenoid valve (27), compressor chamber ventilation grills (22) and compressor's cooling ventilation fan (23).

Figure 11:
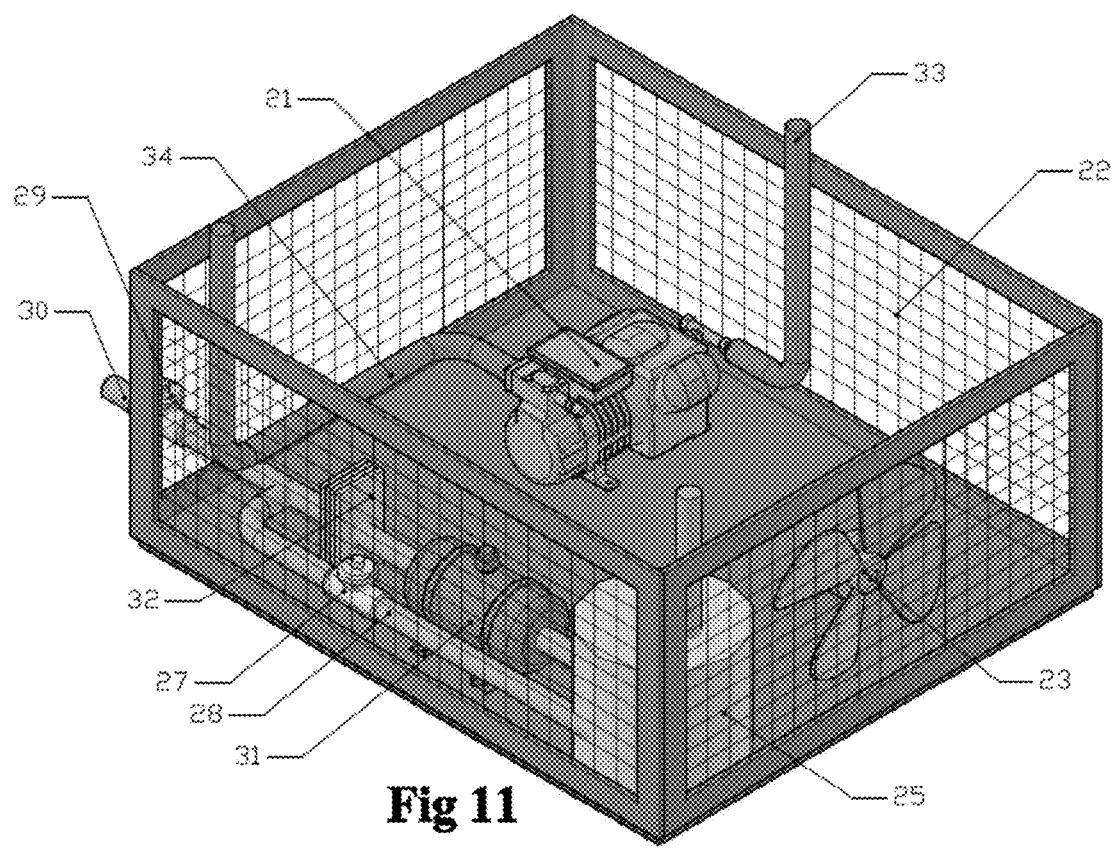
FIG. 11. is a perspective view of the compressor chamber of the water generation block of the present invention.
Figure 12:
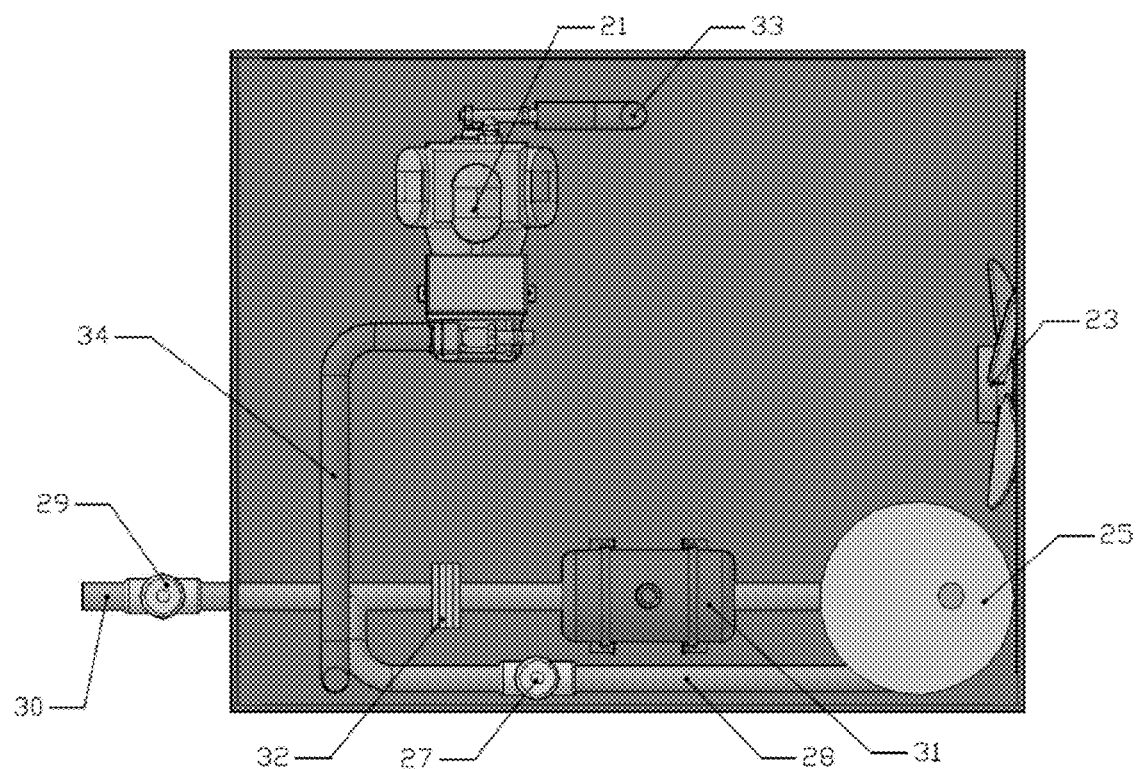
FIG. 12. is a top view of the compressor chamber of the water generation block.

In FIG. 11 and FIG. 12 are represented respectively the perspective view and top view of the compressor chamber (3) of the water generation block of the present invention. The figures show the arrangement of main equipment including: compressor (21), refrigerant suction (33) and discharge (34) pipes, water collecting tank (25), water pump (31), cascade of water filters (32), water supplying pipe (30) with solenoid valve (29), water recirculation pipe (28) with solenoid valve (27), ventilation grills (22) and compressor's cooling ventilation fan (23). The ventilation fan (23) serves for improving operation conditions of the compressor by its effective cooling which is essential in hot climatic conditions.

The water in the collecting tank (25) is periodically recirculated through the cascade of water filters (32) by pump (31) and recirculated by by-passing pipe (28) and opened water solenoid valve (27). The repeated circulation of generated water through the cascade of water filters by the action of the pump (31) allows using high rate and small-pore, adsorption media such as a porous-carbon block in the NSF 53 certified filter for filtration of the water from organic compounds, insects, organic contaminants and heavy-metal compounds to purifying the water in accordance with ASHRAE and U.S. federal standards. During the recirculation the solenoid valve (29) is closed. The predetermined duration of recirculation is controlled by a timer connected to solenoid valves (27) and (29). When the water in the tank (25) is purified the timer closes the solenoid valve (27) and opens the solenoid valve (29) and pure water is pumped via the water supplying pipe (30) to the water storing tank (35) of the water dispensing block.

Figure 13:
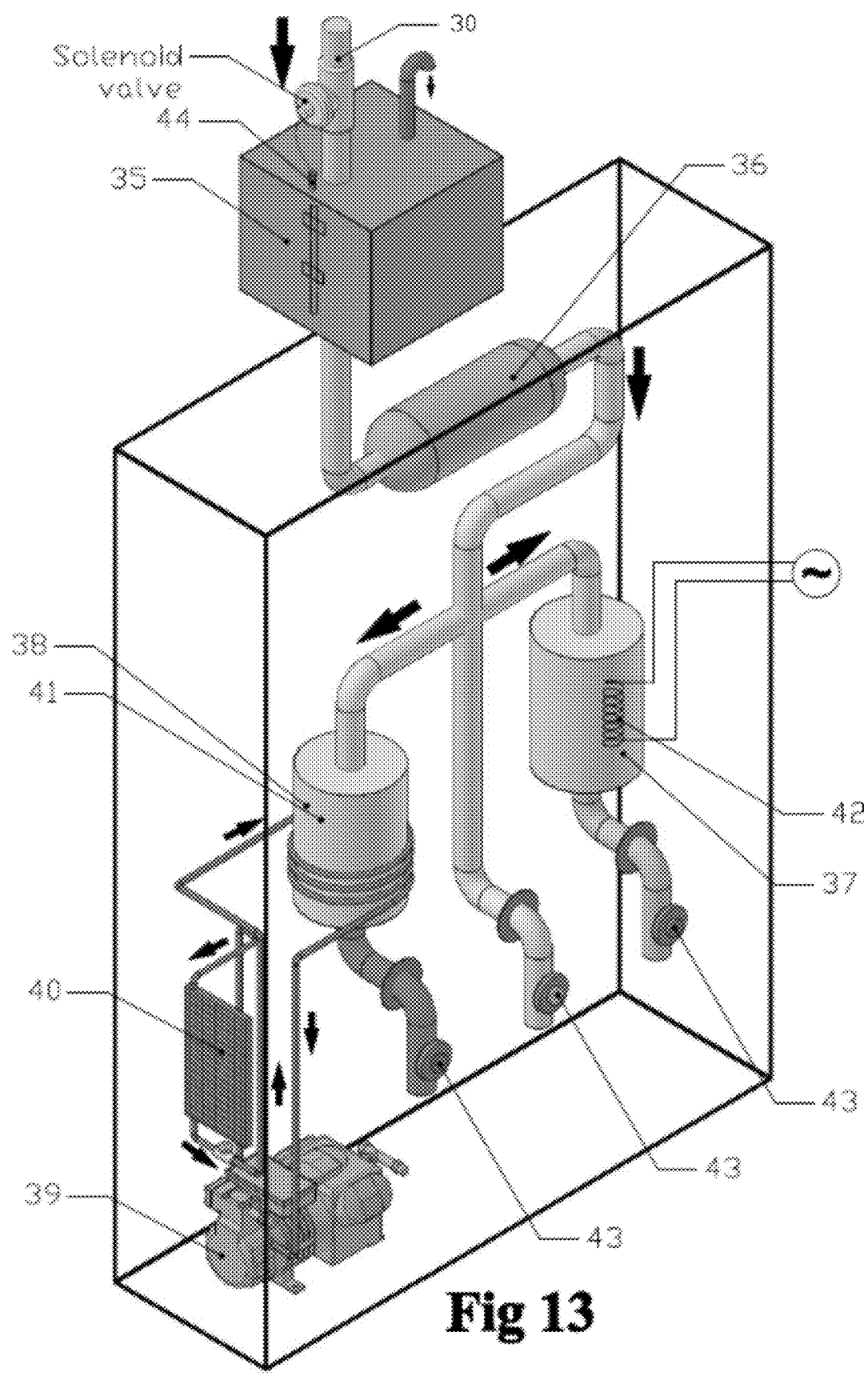
FIG. 13. is a perspective view of the water dispensing block of the present invention.

FIG. 13. is a perspective view of an embodiment of a water dispensing block of the present invention, showing the arrangement of main equipment including: purified water storing tank (35) connected to the water supplying pipe (30) coming from water generator block. The water storing tank (35) is equipped with air eliminator and water level controlling sensors (44), UV tube (36). The pure potable water flows through the UV tube by gravity into the hot water insulated tank (37) having electric heater (42) and cold water insulated tank (38) having cooling coil (41) of a water chiller consisting of a compressor (39), condenser (40) and TRV. The cold, hot and ambient temperature waters are delivered to users trough push button taps (43) mounted on corresponding delivering tubes.

The water level in the water storing tank (35) is controlled by electrically-operated sensor switch (44), which causes the pump (31) to cease operation when the water storing tank (35) is filled. When both water storing tank (35) of the dispenser block and water collecting tank (25) of the water generator block are filled the electrically-operated sensor switch stops both compressor (21) and water pump (31) of the water generator block. When water storing tank (35) of the dispenser block is full of water and water collecting tank (25) of the water generator block is empty or not completely filled the electrically-operated sensor switch stops the water pump (31) of the water generator block but compressor (21) continues operating for producing water to fill the water collecting tank (25) of the water generator block.

Operation of the Apparatus of this Invention

The compressor unit (21) installed at the bottom of compressor chamber (3) of the water generator block (1) exhausts the refrigerant's vapors from the evaporator (12) by the refrigerant suction tube (33) and after having compressed it up to the condensation pressure forces into the condenser (15) by discharge pipe (34). The ribbed pipe type condenser (15) is mounted on the rear panel (5) of the housing of air mixing chamber (2) of water generator block (1). The condenser (15) is equipped with direct and reverse rotating variable speed exhausting fan (16). In the condenser (15) the vapor of refrigerant transfers its latent heat to the mixture of cooled and outside air which is exhausted through the heat transfer surface of the condenser (15) by the help of fan (16). As a result of heat exchange the air mixture is heated and evacuated outside and the vapor of the refrigerant transforms into liquid and then passes through the temperature regulating valve TRV (24). In the TRV (24) the pressure of the liquid refrigerant is decreased to a value which provides temperature of the liquid refrigerant bellow the value of dew point of intake outside air. The cold liquid refrigerant enters into the evaporator (12) and fixes temperature on its surface approximately equal to the temperature of liquid refrigerant.

The direct and reverse rotating variable speed fan (16) draws the outside air into the inside space of air mixing chamber (2) of the water generator block (1). Incoming outside air first is filtered through tightly-sealed and easy replaceable filter (11) fitted on the air intake port (10) of the front vertical panel (4) of air mixing chamber (2) for removing particulates, insects, dust and aerosols from the incoming air. Then the incoming air passes through finned tube evaporator (12) coated with special inert food grade painting. The cold refrigerant keeps the surface temperature of the evaporator lower than the dew point temperature of air. In consequence of the heat exchange the intake outside air is cooled and the water vapor contained in the air is condensed on the food graded coated surface of evaporator (12). In this heat exchange process the liquid refrigerant transforms into gas (vapor) and sucked again back into the compressor (21). The water from the surface of the evaporator drips by gravity into a receptor tray (26) installed under the evaporator (12). From receptor tray (26) the water by a tube runs by gravity into a water collecting tank (25).

The processed and dried air mixture is evacuated outside through the condenser (15) and outlet port (13) installed on the rear panel (5) of the air mixing chamber (2). The outlet port (13) is equipped with gravity type louvered screen (14) which is opened under air-blast and automatically closes and provides the tightness of air mixing chamber (2) for preventing the penetration of insects and dust when water generating block is switched off.

For controlling the temperature of condensation under variable temperatures of outside air it is necessary to draft variable quantity of air through the condenser (15). For regulating the quantity and temperature of air which has to pass through the condenser (15), a mixture of dried and cold air exiting from the evaporator (12) and outside air is used. To prepare the mixture of airs the water generator is equipped with inward-opening revolving doors (17) installed on both right (6) and left (7) side vertical panels of air mixture chamber (2) and located between evaporator (12) and condenser (15). The preparation and use of air mixture provide better cooling and efficient condensation of the refrigerant in the condenser (15) which is especially needed when the generator operates under very hot and humid climatic conditions.

The revolving doors (17) are equipped with air filters and are fixed on shafts (18), which revolve by a sampling servomechanism (19) serving to regulate the automatic opening/closing and proper positioning of revolving doors (17). The sampling servomechanism (19) operates in response to commanding generating processor (20) in accordance with a programmed matrix of required outside air flow through the evaporator and condenser under various combinations of outside air temperatures and relative humidity. The higher the outside air temperature, the wider the doors are opened. When at the same time ambient air temperature is lower than 20° C. and relative humidity is less than 30-35%, the sensors system and operating mechanism stop running the water generator and hermetically close the revolving doors (17) for preventing penetration of insects and bacteria into the cabinet of the generator.

If ambient air temperature during daytime grows higher than 20° C. the sensors system and operating mechanism automatically restart the compressor (21), air fans (23) and open the revolving doors (17) up to the proper position according to the ambient temperature and relative humidity. Thus, the water generation, purification and its pumping to the tank of water dispensing block continues.

Variable speed fans (23) serve also for regulating the flow of intake outside air according to a matrix of combinations of outside air temperatures and relative humidity. The noted matrix is programmed in the processor (20) which controls the reliable and efficient operation of refrigerant compressor (21) and as well as the water productivity of the apparatus in accordance with variable temperatures and relative humidity. The intake air filter (11) does not need to be equipped with sensors and other facilities to warn when the air filter is corked, as reverse rotating fan (23) periodically operates in reverse direction. In this regime the stream of outside air periodically blows first through the condenser (15) where it is heated and then passes through the evaporator (12) and afterwards through the air filter (11) where it blows out the dust and pollen from the air filters (11). Besides cleaning the filter (11), the hot air evaporates liquid refrigerant in the evaporator (12) and helps to prevent the freezing of evaporator (12). During the filter cleaning the water generator continues operating and water production is not interrupted which saves energy. The periodicity of the fan's reverse operation for cleaning the air filter (11) is predetermined and executed by the help of a timer connected to the electric circuit of the fan's motor.

The water collected in tank (25) is periodically circulated through the cascade of water filters (32) by pump (31) and recirculated through by-passing pipe (28) and opened water solenoid valve (27) back to tank (25). The repeated circulation of generated water through the cascade of water filters (320 by pump (31) allows using high rate and small-pore, adsorption media such as a porous-carbon block in the NSF 53 certified filter for filtration the water from organic compounds, insects, organic contaminants and heavy-metal compounds to purifying the water in accordance with ASHRAE and U.S. federal standards. During the recirculation the solenoid valve (29) is closed. The predetermined duration of recirculation is controlled by a timer connected to solenoid valves (27) and (29). When the water in the tank (25) is purified the timer closes the solenoid valve (27) and opens the solenoid valve (29) and pure water is pumped through water supplying pipe (30) to the water-storing tank (35) of the water-dispensing block. The ambient temperature water from collecting tank (25) flows by gravity through UV tub (36) into the hot water tank (37) and constantly is heated by electric heater (42). For delivering hot water the push button tap (43) mounted on hot water conducting tubing is pressed and the hot water from the tank (37) by gravity flows to the user. The temperature of hot water is controlled on the level 90° C. by incorporated thermostat. For preparing cold water the dispensing apparatus includes its own refrigerating machine consisting of compressor (39), condenser coil (40) and evaporator coil (41), which is fitted on the surface of cold-water tank (38). For delivering cold water the push button tap (43) which is mounted on cold water conducting tubing is pressed and the water from cold-water tank (38) flows through the UV tube (36) to the user. A cold-water temperature sensor and switch assembly controls the operation of refrigerator machine to maintain the predetermined temperature of the cold water at about 5° C. For delivering ambient temperature water the push button tap (43) mounted on water conducting tubing is pressed and the ambient temperature water from water storing tank (25) by gravity flows through the UV tub (36) to the user.

The water-storing tank (35) is equipped with air eliminator and water level controlling sensors. The water level in the water-storing tank (35) is controlled by the electrically-operated sensor switch (44), which causes the pump (31) to cease operation when the water-storing tank (35) is filled. In the case of when both water storing tank (35) of the dispenser block and water collecting tank (25) of the water generator block are filled the electrically-operated sensor switch (44) stops at once both compressor (21) and water pump (31) of the water generator block. In the case of when water storing tank (35) of the dispenser block is full of water and water collecting tank (25) of the water generator block is empty or not completely filled the electrically-operated sensor switch (44) stops the water pump (31) of the water generator block but compressor (21) continues operating for producing water to fill the water collecting tank (25) of the water generator block.

The described system and method of automatic control provides high efficiency and productivity of the invented split type potable water extractor from ambient air and water dispenser.

What is claimed is:

1. A split type potable water extractor system, comprising:
   a water generating block, said water generating block being located outside a water use area for direct contact with outside air;
   a water dispensing block, said water dispensing block being located inside a water use area;
   said water dispensing block connected by water transmission piping to said water generating block;
   said water generating block further comprising an air mixing chamber and a compressor chamber;
   said air mixing chamber having plurality of panels forming a hermetic housing enclosure;
   said hermetic housing enclosure including a first panel having an inlet port for intake of air from the outside;
   said hermetic housing enclosure including a second panel having an outlet port for discharging of air to the outside;
   a fan mounted in proximity to said outlet port;
   said hermetic housing enclosure including a door connected to a servomechanism for controlling the opening and closing of said door;
   wherein conditions in said air mixing chamber is regulated by a matrix of controls using the combination of said inlet port, said outlet port, said door, and said fan operating in coordination; and
   wherein refrigerant is cycled through said air mixing chamber to effect heat exchange with air circulated in said air mixing chamber such as to produce condensate, said condensate collected as water, said water processed by a water purification system in said compressor chamber, and the resulting purified water is piped to said water dispensing block for usage.

2. The air mixing chamber of claims 1 enclosing a refrigerant system, further comprising:
   an evaporator located in said mixing chamber and mounted in proximity to said inlet port;
   a receptor tray mounted under said evaporator for collecting condensate from said evaporator;
   a condenser communicating with said evaporator, said condenser mounted in proximity to said outlet port;
   said fan operating to regulate the temperature of said condenser;
   wherein said refrigerant is circulated through said condenser and said evaporator, whereupon said refrigerant undergoes heat exchange with the air circulated in said mixing chamber, thereby causing condensate to form on said evaporator which is collected in said receptor tray.

3. The inlet port of claim 1 having an air filter for removing particulates, insects, dust and aerosols from the incoming air.

4. The outlet port of claim 1 having a gravity-type louvered screen, wherein said gravity-type louvered screen is capable of opening in response to operation of said fan and capable of closing to prevent penetration of insects and bacteria into the said air mixing chamber.

5. The side panels of claim 1, wherein said openings are equipped with air filters for preventing penetration of impurities into the air mixing chamber.

6. The servomechanism of claim 1, wherein said servomechanism is capable of automatically opening and closing said doors for controlling the induction of outside air into said air mixing chamber to regulate the temperature of condensation of the refrigerant in response to variable temperatures and climatic conditions of the outside air.

7. The servomechanism of claim 1, wherein said servomechanism operates in response to the commands of a processor acting by a programmed matrix of required air flow through the evaporator under various combinations of air temperatures and relative humidity.

8. The fan of claim 1, wherein said fan is capable of operating at variable speed, with direct and reverse operation, the operation of said fan facilitating regulation of air flow in said air mixing chamber.

9. The evaporator according to claim 2, said evaporator being coated with food grade painting and designed to be non-freezing by keeping its surface temperature below the dew point temperature of intake outside air.

10. The compressor chamber of claim 1 having a water purifying and control system, further comprising:
    a collecting tank mounted in communication with a receptor tray in said air mixing chamber;
    said collecting tank connected to a pump;
    said pump connected to a supply pipe;
    said supply pipe provided with a plurality of cleaning filters arranged in series;
    said supply pipe having a first solenoid valve at a distal end thereof;
    said supply pipe intersected by a recirculation by-passing pipe between said plurality of filters and said first solenoid valve;
    said recirculation by-passing pipe having a second solenoid valve and connected to said collecting tank;
    wherein water in said collecting tank is circulated by said pump periodically through said plurality of water filters and back to said collecting tank by said recirculation by-passing pipe, such that when the water in said collecting tank is completely purified the second solenoid valve is closed on said recirculation by-passing pipe and the first solenoid valve is opened to allow pure water to be pumped through said supply pipe to said water dispensing block.

11. The compressor chamber of claim 10, further comprising a ventilation fan, said ventilation fan capable of circulating outside air into said compressor chamber for cooling.

12. The water generating block of claim 1, wherein said compressor chamber is located under said air mixing chamber, said compressor chamber having four side panels with ventilation grilles, and said compressor chamber being separated from said mixing chamber by a panel which prevents hot air penetration from said compressor chamber into said air mixing chamber.

13. The water dispensing block of claims 1 or 10, further comprising:
    a water storing tank, said water storing tank connected in communication with said collecting tank in said water generating block by said water supply pipe;
    a UV-transparent tub mounted under said water storing tank for providing gravity flow of water to a hot water tank and a cold water tank;
    said hot water tank having an electric heater to heat the water in said hot water tank;
    said cold water tank having cooling coils connected to a compressor to cool the water in said cold water tank;
    said cold water and hot water tanks are equipped with water delivering tubs having push button taps.

14. The water storing tank of claim 13, said water storing tank equipped with water level controlling sensors connected to said pump and said compressor in said water generator block, wherein the water level in said water storing tank is controlled by an electrically-operated sensor switch which causes said pump to cease operation when said water storing tank is filled.

15. The electrically-operated sensor switch of claim 14, wherein said electrically-operated sensor switch stops both said compressor and said pump when both the water storing tank of the dispenser block and the water collecting tank of the water generator block are filled.

16. The electrically-operated sensor switch of claim 14, wherein, when water storing tank of the dispenser block is full of water but the water collecting tank of the water generator block is not completely filled, said electrically-operated sensor switch stops the water pump of the water generator block but permits the compressor to continue operating for producing water to fill the water collecting tank of the water generator block.

17. The cold water tank of claim 13 further comprising a cold-water temperature sensor and switch assembly control to maintain the predetermined temperature of the cold water at approximately 5° C.

18. A split type potable water extractor system, comprising:
    a water generating block, located outside a water use area for direct contact with outside air, said water generating block comprising an air mixing chamber and a compressor chamber;
    said air mixing chamber further comprising:
        a plurality of panels forming a hermetic housing enclosure;
        an inlet port formed in one said panel;
        an outlet port formed in one said panel;
        a fan mounted in proximity to said outlet port;
        at least one said panel having an opening covered by a door hinged on a vertical shaft, said shaft connected to a servomechanism for controlling the opening and closing of said door;
    said air mixing chamber enclosing:
        an evaporator mounted in proximity to said inlet port;
        a receptor tray mounted under said evaporator for collecting condensate from said evaporator;
        a condenser communicating with said evaporator, said condenser mounted in proximity to said outlet port;
        said fan operating to regulate the temperature of said condenser;
    said compressor chamber further comprising:
        a collecting tank mounted in communication with said receptor tray in said air mixing chamber;
        said collecting tank connected to a pump;
        said pump connected to a supply pipe;
        said supply pipe provided with a plurality of cleaning filters arranged in series;
        said supply pipe having a first solenoid valve at a distal end thereof;
        said supply pipe intersected by a recirculation by-passing pipe between said plurality of filters and said first solenoid valve;

said recirculation by-passing pipe having a second solenoid valve and connected to said collecting tank;

a water dispensing block, located inside a water use area and connected by water transmission piping to said water generating block, said water dispensing block further comprising:

a water storing tank, said water storing tank connected in communication with said collecting tank in said water generating block by said water supply pipe;

a UV-transparent tub mounted under said water storing tank for providing gravity flow of water to a hot water tank and a cold water tank;

said hot water tank having an electric heater to heat the water in said hot water tank;

said cold water tank having cooling coils connected to a compressor to cool the water in said cold water tank;

said cold water and hot water tanks are equipped with water delivering tubs having push button taps;

wherein condensate is formed by heat exchange between refrigerant circulated through said evaporator and air circulated in said mixing chamber, said condensate being collected as water in said receptor tray, said water runs by gravity to said collecting tank in said compressor chamber, said water in said collecting tank purified by circulation through said filters, whereupon said purified water is dispensed to said dispensing block for usage via said push button taps.

19. A method for extracting water from ambient air and dispensing for usage, the steps comprising:

circulating refrigerant through a refrigerant system comprising a condenser and an evaporator contained in an air mixing chamber;

circulating air through said air mixing chamber, wherein the circulation of said air is regulated by a system comprising a hermetic housing enclosure having an inlet port in a front side of said housing, an outlet port in a rear side of said housing, at least one opening regulated by a mechanical door in a side of said housing, and a fan;

causing heat exchange between said refrigerant system and said air circulated in said air mixing chamber to produce condensate;

collecting said condensate;

purifying said condensate through a purification system in a compressor chamber;

dispensing said purified water for usage.

* * * * *